Figure 1:
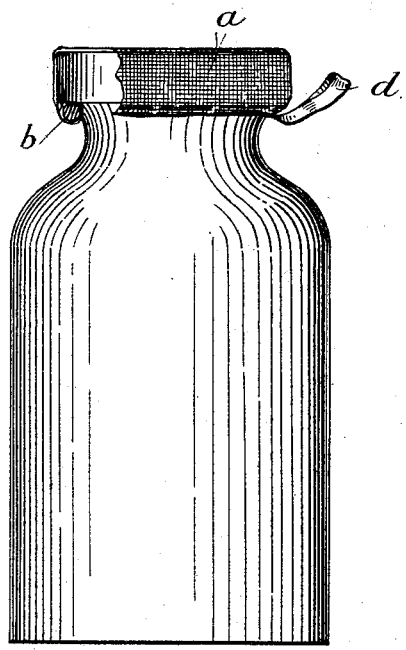

(No Model.)

S. F. GREEN.
SELF ADJUSTING COVER FOR VESSELS.

No. 409,354. Patented Aug. 20, 1889.

WITNESSES.
Charles E. Foulds
Chas. Amon.

INVENTOR.
Sarah F. Green
By James N. Lancaster
Attorney.

UNITED STATES PATENT OFFICE.

SARAH F. GREEN, OF BROOKLYN, NEW YORK.

SELF-ADJUSTING COVER FOR VESSELS.

SPECIFICATION forming part of Letters Patent No. 409,354, dated August 20, 1889.

Application filed February 21, 1889. Serial No. 300,789. (No model.)

*To all whom it may concern:*

Be it known that I, SARAH F. GREEN, a citizen of the United States of America, and a resident of Brooklyn, in the county of Kings, State of New York, have invented certain new and useful Improvements in Self-Adjusting Covers for Vessels Containing Food, of which the following is a full, clear, and exact specification.

My invention relates to an adjustable cover for vessels containing articles of food, which I shall fully describe hereinafter.

My invention consists of a cover or shield for jars, said cover being formed of screen-cloth, cheese-cloth, lawn, lace, or other flexible material; but I prefer to have it of loosely-woven cloth, as represented in the drawings, and mounted on an elastic band, the latter adapted to hold it to a jar or other vessel containing any article of food, liquid or solid.

Figure 2:
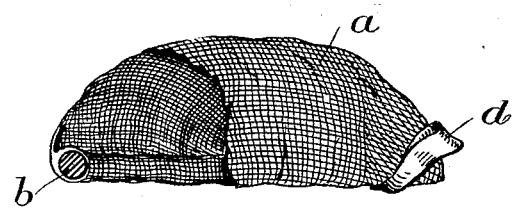

In the drawings, Figure 1 represents an elevational view of a jar having my adjustable cover thereon, which is partly in section and elevation. Fig. 2 represents the cover detached and shown partly in section and elevation.

Similar letters refer to similar parts throughout the drawings, in which—

$a$ represents the gauze mounted on the elastic cord $b$, to which is secured a loop or lifter $d$, adapted to raise the cover from the jar whenever necessity requires it. This cover is not only adapted to jars, but I may use it on milk-cans, tumblers, cups, &c. It will be obvious that it may be used with various forms of vessels. It will also be obvious that with this invention dust and insects are prevented from settling upon the contents of the jar, yet the air is allowed to enter, which is very essential in this instance.

Having thus described my invention, what I claim as new, and desire to secure by Letters Patent, is—

The combination, substantially as shown and described, consisting of the gauze $a$, elastic cord $b$, and loop or lifter $d$, the whole forming a complete device.

In testimony that I claim the foregoing I have hereunto set my hand this 7th day of September, 1887.

SARAH F. GREEN.

Witnesses:
CHARLES E. FOULDS,
JULIAN A. HURDLE.